July 5, 1949.　　　　　　G. CAMILLI　　　　　　2,474,825
TESTING ARRANGEMENT FOR PROTECTED
ELECTRICAL APPARATUS
Filed Feb. 24, 1944
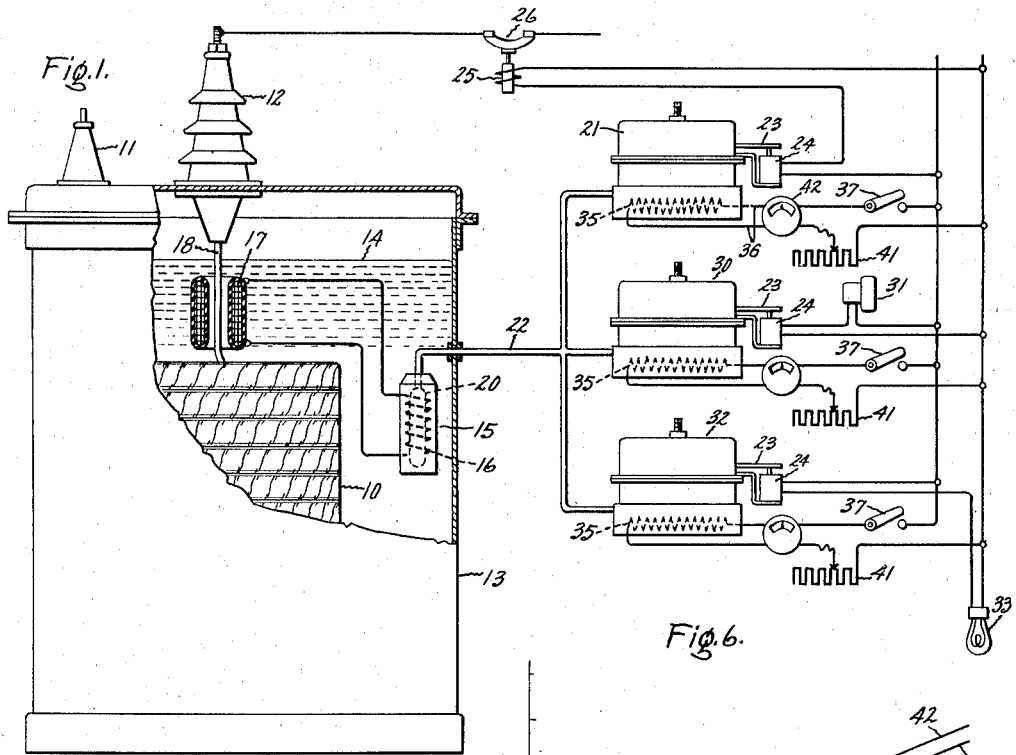
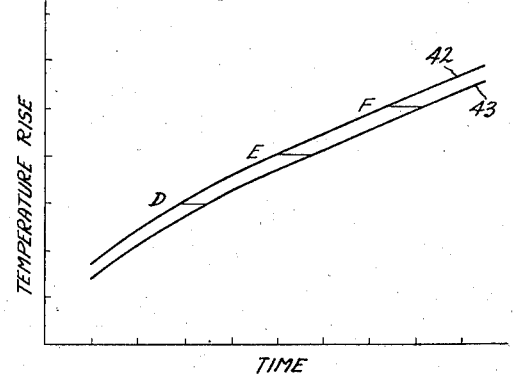
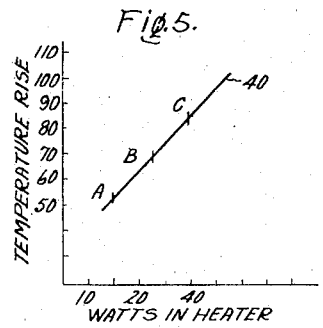
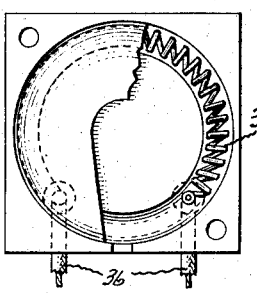
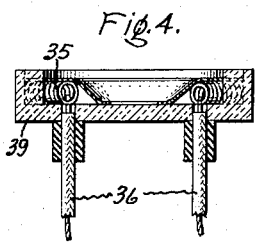
Inventor:
Guglielmo Camilli,
by Harry E. Dunham
His Attorney.

Patented July 5, 1949

2,474,825

UNITED STATES PATENT OFFICE 2,474,825

TESTING ARRANGEMENT FOR PROTECTED ELECTRICAL APPARATUS

Guglielmo Camilli, Pittsfield, Mass., assignor to General Electric Company, a corporation of New York Application February 24, 1944, Serial No. 523,664

4 Claims. (Cl. 73—1)

My invention relates to a protected electrical apparatus and to an improved arrangement for protecting the apparatus under overloads, and to an improved method of testing the operative condition of the protective arrangement.

Heretofore it has been customary to obtain an indication of the hot spot temperature of an electrical induction apparatus, such as transformers, through a thermal responsive device in the oil which is also heated by a heating coil in response to current carried by the transformer. A relay responsive to such thermal responsive device may give an indication of the temperature of the coils or may turn on cooling fans or may operate a breaker relay to disconnect the transformer from the circuit.

An object of my invention is to provide an improved protective arrangement for an electrical apparatus.

Another object of my invention is to provide an improved protected electrical induction apparatus which is simple in construction, easy to manufacture, and efficient in operation.

A further object of my invention is to provide an improved method of testing the operative condition of a protective device for an electrical induction apparatus.

In the drawing Fig. 1 is a side elevation in partial section of an electrical induction apparatus which is provided with an embodiment of my invention; Figs. 2, 3, and 4 illustrate in further detail the thermal relay employed in the system of Fig. 1, and Figs. 5 and 6 illustrate curves which will be used in describing my improved method in testing the operative conditions of the protective device.

Referring more particularly to Fig. 1 of the drawing, I have illustrated a protected electrical apparatus such as a transformer which includes a conventional winding 10 having a relatively low voltage bushing 11 and a relatively high voltage bushing 12. The winding is surrounded by an enclosing casing 13 which is filled with a suitable dielectric or cooling fluid 14, such as transil oil or chlorinated aromatic hydrocarbon such as the type disclosed in Clark Patent 2,041,594, issued May 19, 1936, and which is assigned to the same assignee as this present invention.

In order to operate a thermal responsive device in response to a function of a suitable temperature of the apparatus, such as hot spot winding temperature so that the apparatus may operate along any suitable predetermined overload-time curve, a protective device is provided including a thermal responsive device 15 which is in heat exchange relation with a portion of the oil, such as by being immersed therein. In order to heat the thermal responsive device 15 in response to a hot spot temperature of the winding a heating coil 16 is provided in heat exchange relation thereto, and which is connected to the secondary 17 of a current transformer. The primary of the current transformer includes a conductor 18 which carries a load current. In order to provide an arrangement which is operative in response to a predetermined temperature the thermal responsive device 15 is provided with a bulb 20 which is surrounded by the coil 16 and immersed in the transformer oil. The bulb is connected to a suitable bellows within a thermal relay 21 through a tube 22 in a conventional manner. The bulb, bellows, and tube contains a suitable fluid which expands upon heating so that when a predetermined temperature obtains the bellows will operate an operating arm 23 for operating a switch mechanism 24. The switch 24 may accomplish any suitable function such as being connected to an operating relay 25 of a circuit breaker 26 so that the transformer may be disconnected upon a predetermined overload time condition having been obtained. Any other suitable number of thermal relays may be provided, and in the construction shown in Fig. 1 a second thermal relay 30 is provided which is adapted to operate a fan 31 so as to blow air over the cooling coils of the transformer. A third thermal relay 32 is provided which operates a switch to turn on an indicating light 33. Any other suitable thermal responsive arrangement may be provided and the particular thermal responsive device 15 is of the same type as described and claimed in patent application S. N. 517,046, filed January 5, 1944, and assigned to the same assignee as this prevent invention.

It is to be understood that in operation the protective device may turn on the various switches at various temperatures, for example, the fan may be turned on when the bulb reaches a temperature of 85 degrees C., the light may be turned on when the bulb reaches 100 degrees C., and the circuit breaker may be operated when the bulb or thermal responsive device reaches 115 degrees C. It is to be understood that these temperatures correspond to certain hot spot temperatures which will usually be higher than the bulb temperature. Such a thermal responsive or protective device is suitably calibrated at the factory to operate at temperatures, such as those listed above. It will be understood, however, that it is desirable to test the protective device such as when it is in the field and under operative conditions. The testing could be accomplished by running a predetermined load current through the winding to operate the thermal responsive device, or the heater could be disconnected from the secondary of the current transformer and connected to a suitable source of potential and heated a predetermined amount in order to see whether the various bellows operate at the desired temperatures. These methods, however, are open to the objection that the protective device could not be tested while the transformer is being operated.

In order therefore to provide an improved arrangement for testing the operative conditions of the protective device, particularly in the field, I provide an auxiliary coil 35 which is adapted to be connected to a suitable potential such as through the leads 36 and switch 37. The coil 35 may be supported in heat exchange relation to any suitable part of the thermal responsive arrangement and in the construction illustrated more particularly in Figs. 2, 3 and 4 the auxiliary heating coil 35 is attached to the outer casing of the thermal relay 21 which encloses the bellows 38 through a bracket arrangement 39. Therefore, when it is desired to test the operative condition of the protective device the switch 37 may be closed and a predetermined amount of watts passed through the auxiliary heating coil. If the relay operates when a predetermined number of watts are transferred to the protective device the operator will know that the protective device operates satisfactorily.

In order to test the protective device by the method described above the testing device is calibrated in the factory. This may be accomplished in any suitable manner such as by first being sure that the protective device operates satisfactorily, and then calibrating the auxiliary heater by testing in order to see the amount of watts required to operate each of the three bellows. Thus for example, let us assume that the ambient temperature is 30 degrees and it will therefore take a temperature rise of 55 degrees above ambient to operate the thermal relay 30 to turn on the fans. By trial and error the heater 35 may be heated until the thermal relay 30 does operate and then the amount of watts necessary to operate the bellows may be recorded, thus giving point A on the curve of Fig. 5. In the curve of Fig. 5 it will be seen that the temperature rise over ambient in degrees centigrade is plotted as ordinate and the watts necessary for operation of the bellows on the abscissa axis. Points C and B which correspond to relays 21 and 32 may be obtained in a similar manner so as to obtain the straight line curve 40.

Having the calibration curve as is shown in Fig. 5 it will be seen that my improved method of testing the protective device may be accomplished as follows in the field without disconnecting the transformer from the circuit. The switch 37 may be closed through a potentiometer 41 and a watt meter 42, the potentiometer being set so that the number of watts flowing corresponds to point C. If this causes the relay 21 to operate the operator will know the device is operating satisfactorily. Suitable wattage may be employed in order to test the relays 30 and 32.

Another and more rapid method of testing is to obtain a characteristic curve as is illustrated in Fig. 6 which gives the temperature rise vs. the time the various relays take to operate when a predetermined number of watts is being dissipated by the heating coil 35. When the switch 37 is closed the time may be noted in the factory from the time the switch is closed until the relay 21 operates in order to obtain point F. Points D and E may be obtained in similar manner for the time it takes for the relays 30 and 32, respectively, to operate. Two curves 42 and 43 are provided for the maximum and minimum time for operation of the relays for a certain temperature rise. Then in the field the switch may be closed and if the relays operate in the various times according to Fig. 6, the operator will know that the protective device is operating satisfactorily. I have found that this is a very efficient method of testing and for instance upon duplicate tests I have found that the various relays close within a range of about 5 seconds or in the range of the curves given in Fig. 6. As will be seen in Fig. 1 I provide a separate heating coil 35 for each of the three thermal relays 21, 30 and 32, for testing each of the three relays. However, since the bellows in each of the three relays operates through a single closed system, one heater 35 could be used for all the relays, if desired.

With my improved testing arrangement the operator need not take into consideration the actual temperature of the transformer or thermal responsive device 15. Thus since the curves of Figs. 5 and 6 give temperature rise over ambient, and also as the thermal system operates upon an increase in pressure of the fluid within the closed fluid system due to an increase in temperature, my testing arrangement operates without regard to the actual temperature of the transformer.

In other words, the fluid pressure in the closed system is a measure of the maximum temperature in the system. Under normal operating conditions the temperature of bulb 20 is higher than the temperature of the bellows 38 because the transformer losses raise its temperature above that of the ambient. The pressure throughout the system is then a function of the bulb temperature only and is independent of the temperature of the bellows so that accurate transformer temperature response is obtained without the error which otherwise would occur due to variations in bulb temperature as the latter follows normal variations in ambient temperature. Under test conditions the bellows must therefore be hotter than the bulb and the pressure throughout the system then is a measure of the bellows temperature only and is independent of the temperature of the bulb. From this it follows that the system is a substantially liquid-filled vapor pressure system, i. e., the relatively small amount of the volume in the system not occupied by the liquid is occupied by its vapor. No other system will operate in the above manner. Thus, if the system were entirely liquid filled or entirely vapor filled the pressure would be a measure of the average temperature of the system because the expansion due to heating one part of the system could be cancelled by the contraction due to cooling another part of the system. Under such conditions testing by heating the bellows would be impossible without knowing the bulb temperature. On the other hand, if the system were substantially vapor filled with a relatively small amount of liquid condensate of the vapor in it, then the pressure in the system would be a measure of the minimum temperature or coolest spot in the system because that would be where the liquid would condense out and all the remaining and hotter parts of the system would be vapor filled. Stated differently, maximum temperature response, as distinguished from average temperature response or minimum temperature response, is obtained only when both liquid and vapor phases of the fluid are in contact with each other where the temperature of the system is a maximum and this means that all the rest and necessarily cooler parts of the system are liquid filled.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. The combination with an electric induction apparatus having an enclosing casing, a cooling fluid in said enclosing casing, a bulb within said enclosing casing and in heat exchange relation to a portion of the cooling medium adapted to be heated by said apparatus, switch means, bellows means for operating said switch means, tube means for connecting said bulb and bellows and providing a closed system, said system being substantially filled with a liquid and the remainder being filled with the vapor of said liquid, of an auxiliary heater means in heat conductive relationship with a part of said closed system which is remote from said bulb, and means for connecting said auxiliary heater means to a source of potential so as to heat said closed system a predetermined amount so as to test the operative condition thereof.

2. The combination with an electric induction apparatus having an enclosing casing, a cooling fluid in said enclosing casing, a bulb within said enclosing casing and in heat exchange relation to a portion of the cooling medium adapted to be heated by said apparatus, switch means, bellows means for operating said switch means, tube means for connecting said bulb and bellows and providing a closed system said system being substantially filled with a liquid and the remainder being filled with the vapor of said liquid, of an auxiliary heater means in heat conductive relationship with said bellows, and means for connecting said auxiliary heater means to a source of potential so as to heat said closed system a predetermined amount so as to test the operative condition thereof.

3. The combination with a thermal responsive system of the substantially liquid filled vapor pressure type for protecting encased electric apparatus, said system including a bulb for mounting inside the casing of said apparatus in heat exchange relation with said apparatus, an actuated device for mounting outside said casing, vapor pressure responsive means for mounting outside of said casing connected by a tube to said bulb for actuating said device when the bulb temperature attains a predetermined value, of testing means for said system comprising an auxiliary electric heater in heat exchange relation with said vapor pressure responsive means, and means for selectively causing a predetermined number of watts to be dissipated in said auxiliary electric heater so as to raise the temperature of said vapor pressure responsive means to a predetermined value which is above the temperature of said bulb so as to test the setting of said system independently of the temperature of said bulb while permitting continuous protected operation of said apparatus.

4. The combination with a thermal responsive system of the substantially liquid filled vapor pressure type for protecting encased liquid cooled and insulated electric induction apparatus, said system including a bulb for mounting inside the casing of said apparatus in heat exchange relation with said liquid, an electric heater for raising the temperature of said bulb above the temperature of said liquid in proportion to the current carried by said apparatus, a circuit controller for mounting outside said casing, vapor pressure responsive means for mounting outside of said casing connected by a tube to said bulb for actuating said circuit controller when the bulb temperature attains a predetermined value, of testing means for said system comprising an auxiliary electric heater in heat exchange relation with said vapor pressure responsive means, and means for selectively causing a predetermined number of watts to be dissipated in said auxiliary electric heater so as to raise the temperature of said vapor pressure responsive means to a predetermined value which is above the temperature of said bulb so as to test the setting of said system independently of temperature of said bulb while permitting continuous protected operation of said apparatus.

GUGLIELMO CAMILLI.

REFERENCES CITED

The following references are of record in the file of this patent:

UNITED STATES PATENTS

| Number | Name | Date |
| --- | --- | --- |
| 1,877,990 | Schweitzer | Sept. 20, 1932 |
| 2,026,079 | White et al. | Dec. 31, 1935 |
| 2,053,944 | Cooney | Sept. 8, 1936 |
| 2,095,355 | Cate | Oct. 12, 1937 |
| 2,357,353 | Pearce | Sept. 5, 1944 |

FOREIGN PATENTS

| Number | Country | Date |
| --- | --- | --- |
| 123,114 | Germany | Aug. 26, 1901 |